US008611211B2

(12) United States Patent
Nakash

(10) Patent No.: US 8,611,211 B2
(45) Date of Patent: Dec. 17, 2013

(54) FAST REROUTE PROTECTION OF LOGICAL PATHS IN COMMUNICATION NETWORKS

(75) Inventor: Shell Nakash, Kfar Sava (IL)

(73) Assignee: ECI Telecom Ltd., Petach Tikva (IL)

( * ) Notice: Subject to any disclaimer, the term of this patent is extended or adjusted under 35 U.S.C. 154(b) by 367 days.

(21) Appl. No.: 13/001,348

(22) PCT Filed: Jun. 4, 2009

(86) PCT No.: PCT/IL2009/000557
§ 371 (c)(1),
(2), (4) Date: Dec. 23, 2010

(87) PCT Pub. No.: WO2009/156980
PCT Pub. Date: Dec. 30, 2009

(65) Prior Publication Data
US 2011/0110224 A1      May 12, 2011

(30) Foreign Application Priority Data
Jun. 23, 2008 (IL) .......................................... 192397

(51) Int. Cl.
*H04W 24/04*      (2009.01)
(52) U.S. Cl.
USPC ........... 370/228; 370/217; 370/220; 370/221; 709/238; 709/239
(58) Field of Classification Search
USPC .......... 370/216, 217, 220, 221, 228; 709/238, 709/239
See application file for complete search history.

(56) References Cited
U.S. PATENT DOCUMENTS

2003/0233595 A1* 12/2003 Charny et al. ..................... 714/4
2007/0174483 A1* 7/2007 Raj et al. ....................... 709/238
2008/0031130 A1  2/2008 Raj et al.

OTHER PUBLICATIONS

Le Roux, "P2MP MPLS-TE Fast Reroute with P2MP Bypass Tunnels", Network Working Group Internet Draft, Mar. 2008.*
Balon, Simon et al., "A scalable and decentralized fast-rerouting scheme with efficient bandwidth sharing", Computer Networks, vol. 50, pp. 3043-3063, 2006.
Lai, Wei Kuang et al., "Fast reroute with pre-established bypass tunnel in MPLS", Computer Communications, vol. 31, pp. 1660-1671, 2008.
Pan, Ping et al., "Fast Reroute Extensions to RSVP-TE for LSP Tunnels", Network Working Group, Standards Track, pp. 1-38, May 2005.

(Continued)

*Primary Examiner* — Un C Cho
*Assistant Examiner* — Siming Liu
(74) *Attorney, Agent, or Firm* — Browdy and Neimark, PLLC

(57) ABSTRACT

Technique for fast rerouting (FRR) of traffic in a communication network, from a working path comprising a link with its downstream node, to one or more backup paths concurrently providing link protection and node protection to the link and the downstream node; the method comprises enabling the downstream node to block forwarding of traffic, if received at the downstream node along the backup path(s), towards a more-down-stream node in the working path in case the more-down-stream node participates in providing node protection against a failure of the downstream node, the technique thereby prevents traffic duplication at the more-down-stream node and does not require distinguishing a link failure from a node failure.

8 Claims, 4 Drawing Sheets

(56) References Cited

OTHER PUBLICATIONS

Raj, Alex et al., "A survey of IP and multiprotocol label switching fast reroute schemes", Computer Networks, vol. 51, pp. 1882-1907, 2007.

Vasseur et al., "MPLS Traffic Engineering Fast reroute: bypass tunnel path computation for, bandwidth protection," IETF Internet Draft, pp. 1-49, Oct. 2002.

Le Roux et al., "P2MP J~PLS-TE Fast Reroute with P2MP Bypass Tunnels," Network Working Group Internet Draft, pp. 1-14, Mar. 2008.

* cited by examiner

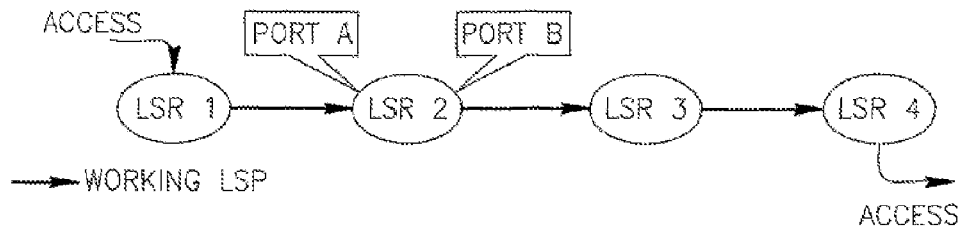
FIG. 1 - PRIOR ART
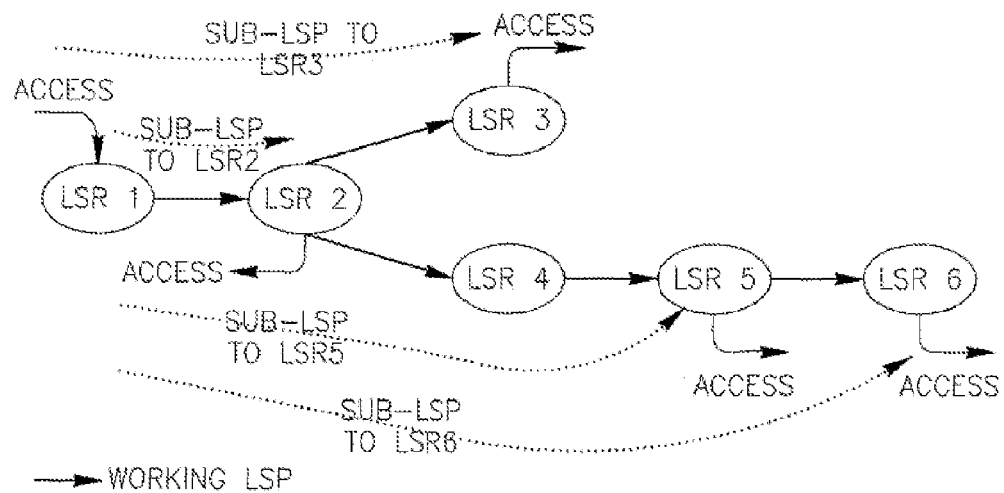
FIG. 2 - PRIOR ART
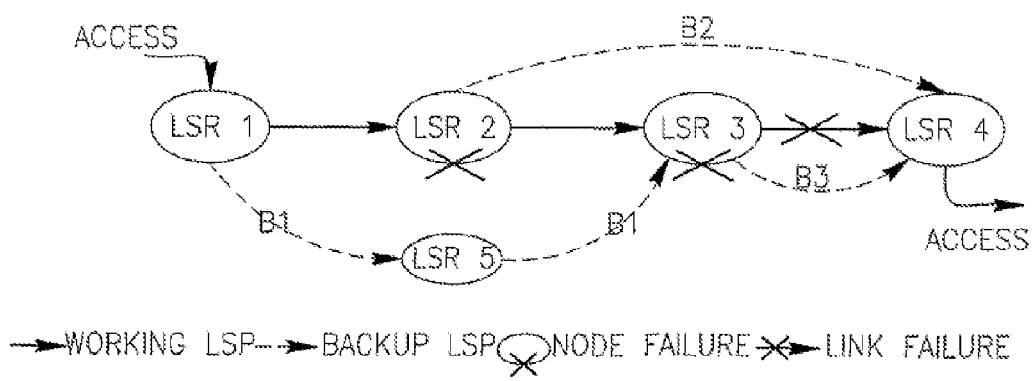
FIG. 3 - PRIOR ART

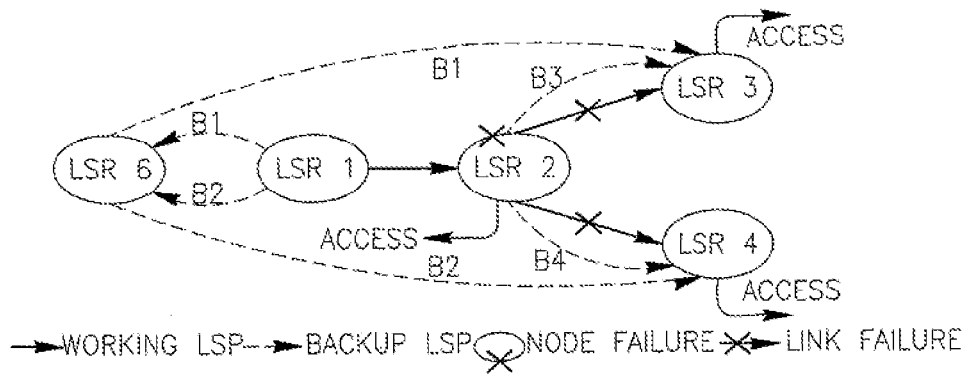
FIG. 4 - PRIOR ART
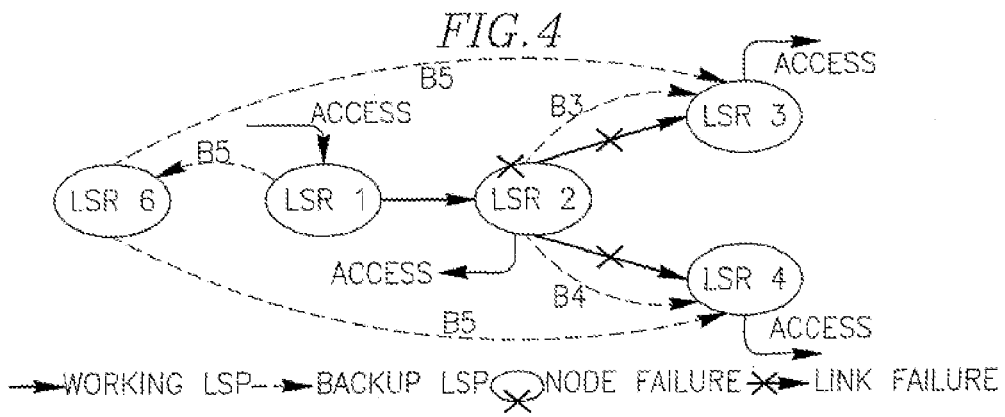
FIG. 5 - PRIOR ART
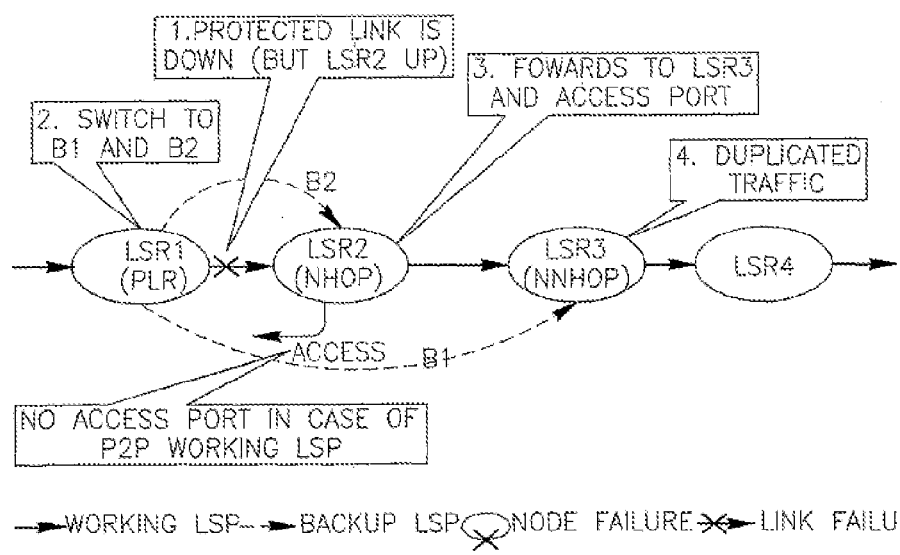
FIG. 6 - PRIOR ART

FAST REROUTE PROTECTION OF LOGICAL PATHS IN COMMUNICATION NETWORKS

FIELD OF THE INVENTION

The present invention relates to the field of data networking, more particularly to protecting logical paths in packet-switched communication networks, and specifically to providing fast reroute (FRR) protection concurrently against either link or node failures along such paths.

The problem addressed by this invention is relevant for various types of networks and data protocols supporting fast reroute (FRR) protection; in the following description, for the sake of illustration, the inventive solution will be presented for multiprotocol label switching (MPLS) networks and for MPLS point to point and point-to-multipoint label switched paths.

BACKGROUND OF THE INVENTION

MPLS Technology

MPLS is a new technology for fast delivery of packet-based traffic along pre-established logical paths called label switched paths (LSPs, a.k.a. tunnels). MPLS supports traffic engineering (TE) to optimize usage of network resources, and is designed to offer a reliable traffic delivery, with predictable quality of service (QoS) and guaranteed capacity (a.k.a., bandwidth). MPLS uses a notion called label to identify, classify and forward data over LSPs.

A point-to-point (P2P) LSP delivers traffic from the access port(s) of a source (a.k.a., ingress) node (a.k.a., label switching router, LSR) downstream to the access port(s) of destination (a.k.a., egress) LSR. The LSP may traverse intermediate (a.k.a., transit) LSRs. Access ports can also be LSR-internal, i.e., the LSR can also generate traffic towards LSP. An LSR may serve as ingress node for one LSP and transit or egress for another.

FIG. 1 illustrates a P2P LSP, that originates at ingress LSR1, traverses through transit LSR2 (from port "a" to port "b") and LSR3, and terminates at egress LSR4. The LSP path may be summarized as 1-2-3-4.

A point-to-multipoint (P2MP) LSP delivers multicast traffic (such as IPTV) from ingress LSR (a.k.a., root) downstream to one or more egress LSRs (a.k.a., leaf, leaves). One example of P2MP LSP is shown in FIG. 2. It is a tree-and-branch structure, where traffic is replicated at transit branch points and then sent to the access port(s) at the leaves. This scheme is efficient in terms of link capacity consumption, as only one copy of the traffic is ever sent per branching link. Multiple copies (a.k.a., traffic duplication) per branch are forbidden, as they could crash the user application.

With P2MP tunnels, any LSR may serve as both a transit and an egress (abbreviated transit&leaf) LSR, in which case it forwards traffic both to its local access port(s), and to downstream LSRs. The point-to-point path to each specific leaf is called a sub-LSP.

FIG. 2 illustrates a P2MP LSP. Multicast traffic gets on the LSP at a root LSR1, sent to a transit&leaf LSR2, replicated towards a leaf LSR3 and a transit LSR4. The traffic is forwarded by LSR4 to a transit&leaf LSR5, which in turn forwards it to a leaf LSR6. Each of the LSRs 2, 3, 5, 6 forwards the traffic also to the local access port(s). As illustrated by dotted lines, there are 4 sub-LSPs, with paths 1-2, 1-2-3, 1-2-4-5, and 1-2-4-5-6.

Note that LSR1 sends only one packet copy to LSR2, even though the link to LSR2 carries 4 sub-LSPs. Similarly, LSR2 sends one copy on the branch to LSR3 and one copy on the branch to LSR4, even though the link to LSR4 carries 2 sub-LSPs.

Fast Reroute (FRR) and Point to Point (P2P) LSPs

A major MPLS feature is the support of fast reroute (FRR). FRR is a mechanism for rapid traffic restoration upon a link or a node failure along the LSP path. With FRR, an interrupted traffic stream can be rerouted around a failed node/link within a time interval of sub-50 milliseconds, thereby minimizing impact on the traffic.

The LSR upstream of the failure (a.k.a., point of local repair, PLR), redirects the traffic of the so-called working, LSP onto a pre-established (P2P) backup LSP (a.k.a., a bypass LSP), which reroutes around the failure. The backup LSP brings the traffic from the PLR to an LSR positioned downstream of the failure (a.k.a., a merge point, MP), after which the traffic returns to the working LSP. The MP is actually the egress LSR of the backup LSP.

For the sake of simplicity, it will be assumed that the MP is the closest possible LSR downstream the failure point, counting from the PLR. Accordingly, with FRR link protection, the MP is PLR's next-hop (NHOP) LSR, i.e., the LSR at the far end of the protected link; in node protection the MP is PLR's next-next-hop (NNHOP) LSR, i.e. the LSR that is placed after the NHOP along the working LSP path (in a general case, it is not obligatory the neighbor of NHOP). The backup LSP may be capable of being shared, i.e. provide protection to multiple working LSPs, in which case it is known as Facility backup LSP.

It will also be assumed that a failure of the protected link triggers both the link and the node protection mechanisms. This procedure is commonly in use and provides fast detection time, since the failure detection is based on rapid physical layer indications. Examples for such indications are: "loss of signal", "signal quality degradation", "remote alarm indication".

FRR protection should preferably be node protection FRR rather than link protection FRR, as the former provides better resiliency. The last hop of an LSP cannot be provided with node protection, i.e., no protection is possible when the egress LSR fails. A fully protected P2P LSP is a P2P LSP having assigned node protection at all its hops, except for the last hop, for which a link protection is assigned.

FIG. 3 illustrates FRR configuration for the P2P working LSP of FIG. 1. This

LSP is fully protected as follows: (1) B1 (B2) protects against the failure of LSR2 (LSR3), it originates at PLR LSR1 (LSR2) and terminates at NNHOP LSR3 (LSR4), respectively. The backup LSP path may include also transit LSRs, as illustrated for B1 which traverses transit LSR5 (2) Backup LSP B3 protects against the failure of the link from LSR3 to LSR4. It originates at PLR LSR3 and terminates at MP NHOP LSR4.

Node FRR Scenario: if LSR2 (LSR3) goes down, as detected by a Point of Local Repair LSR1 (LSR2) due to the failure of the outgoing link to LSR2 (LSR3), the PLR redirects the traffic to B1 (B2), that brings it to MP LSR3 (LSR4), respectively, after which the traffic returns to the working LSP.

Link FRR Scenario: if the link LSR3 to LSR4 goes down, the PLR LSR3 redirects the traffic to B3, that brings it to MP LSR4, after which the traffic is sent to the access port.

Fast Reroute (FRR) and Point-to-Multipoint (P2MP) LSPs

FRR is also applicable for a working P2MP LSP. To protect against a link failure, the PLR needs a single backup LSP towards NHOP. To fully protect a node, the PLR needs a backup LSP per NNHOP. When a backup LSP protects multiple sub-LSPs and FRR is activated, the PLR sends only one copy of the traffic over that backup LSP, thus avoiding traffic duplication.

A fully protected sub-LSP is a sub-LSP assigned node protection at all hops, except for the last hop, for which it is assigned a link protection. A fully protected P2MP LSP is a P2MP LSP for which all the sub-LSPs are fully protected.

FIG. 4. illustrates FRR configuration for the working P2MP LSP of FIG. 2, wherein LSR5 and LSR6 of FIG. 2 are removed and wherein LSR4 becomes an egress LSR. FRR protection is organized as follows: (1) B1 (B2) protects against the failure of LSR2. It originates at PLR LSR1, traverses through a different network node marked LSR6, and terminates at NNHOP LSR3 (LSR4), respectively; (2) B3 (B4) protects against the failure of the link from LSR2 to LSR3 (LSR4), it originates at PLR LSR2 and terminates at MP NHOP LSR3 (LSR4), respectively.

This working P2MP LSP is not fully protected because the sub-LSP to LSR2 has no link protection at the last hop.

Thus, if link LSR1 to LSR2 fails (LSR2 stays up), no traffic will reach the access port of LSR2.

Node FRR Scenario: if LSR2 goes down, as detected by PLR LSR1 via the failure of the link to LSR2, the PLR redirects the traffic to B1 and B2, that brings it to MP LSR3 and LSR4, respectively, after which the traffic is sent to the access ports.

Link FRR Scenario: if the link LSR2 to LSR3 (LSR4) goes down, PLR LSR2 redirects the traffic to B3 (B4), that brings it to MP LSR3 (LSR4), after which the traffic is sent to the access ports.

So far, backup LSPs were P2P LSPs. It is also possible to establish P2MP backup LSPs, as per draft-ietf-mpls-p2mp-te-bypass-02.txt, to optimize protection bandwidth consumption. For example, in case of a node failure, the PLR would redirect the traffic onto a P2MP backup LSP, which would route a single traffic copy towards all NNHOPs.

FIG. 5 illustrates FRR configuration for the working P2MP LSP of FIG. 4, with B1 and B2 replaced by P2MP backup LSP B5, to protect against the failure of LSR2. B5 originates at PLR LSR1, traverses through LSR6, and terminates at NNHOPs LSR3 and LSR4. The advantage of P2MP backup LSP is exemplified at link LSR1 to LSR6, where B5 consumes half as much protection bandwidth compared to the aggregated bandwidth of B1 and B2 of FIG. 4.

This working P2MP LSP is not fully protected because the sub-LSP to LSR2 has no link protection at the last hop. Thus, if link LSR1 to LSR2 fails (LSR2 stays up), no traffic will reach the access port of LSR2.

Node FRR Scenario: if LSR2 goes down, as detected by PLR LSR1 via (due to) the failure of the link to LSR2, the PLR redirects the traffic to B5, that brings it to MP LSR3 and LSR4, after which the traffic returns to the working LSP.

Link FRR Scenario: Same as for FIG. 4.

Traffic Duplication Problem for FRR

Assume that PLR has both the link and the node protection assigned towards the directly connected NHOP and NNHOP(s), respectively. Since it was assumed that FRR (both the link protection and the node protection mechanisms) is triggered based on link failure alone, this would result in the traffic duplication. This problem is referred hereafter as FRR duplication problem.

FIG. 6. illustrates a portion of a P2MP working LSP, flowing on path 1-2-3-4, where LSR2 is a transit&leaf node (it forwards traffic both to LSR3 and to its own Access port). For this LSP to be fully protected, it ought to: (1) Protect transit&leaf LSR2, e.g., via B1. This provides node protection for sub-LSPs whose LSR2 is transit (2) Protect the link LSR1 to LSR2, e.g., via B2. This provides link protection for the sub-LSP whose LSR2 is leaf.

Note that B1 alone cannot make the LSP fully protected, because when the link LSR1 to LSR2 fails (and LSR2 stays up), no traffic would reach the access port at LSR2. Likewise, B2 alone is insufficient, being less resilient than the node protection.

Case A: Link LSR1 to LSR2 goes down but LSR2 stays up. Being unable to distinguish a link failure from a node failure, LSR1 moves traffic to both B1 and B2. LSR3 receives two copies, one from LSR2 and one from B1.

Case B: P2P vs. P2MP Backup. The P2P backup LSPs may be replaced by P2MP backup LSP (not shown). This can improve the protection bandwidth efficiency, but the duplication problem will remain.

Case C: Mixed Node and Link FRR. In the absence of node protection towards some of NNHOPs (if additional NNHOPs exist), they may benefit from link protection. The traffic duplication at LSR3 remains.

Case D: P2P vs. P2MP Working. The P2MP working LSP may be replaced by a P2P working LSP (say, there is no Access port in LSR2). The problem of duplication remains.

When summarizing the prevalence of the FRR duplication problem, one comes to a conclusion that it may occur invariably to P2P and P2MP working LSPs, with either P2P or P2MP backup LSPs. The main cause of traffic duplication is that PLR does not, based on the earlier assumption, distinguish a link failure from a node failure.

A number of solutions have been proposed in the prior art to distinguish a link from a node failure, and thereby could avoid the described problem of traffic duplication.

The PLR could implement mechanisms to distinguish between link and node failures. Upon link (node) failure, the PLR applies only link (node) protection, respectively, thus avoiding traffic duplication. Such an approach is classified as out of scope one in section 4.1.1 of draft-ietf-mpls-p2mp-te-bypass-02.txt: "The PLR needs to localize the failed elements in order to activate the P2MP Bypass Tunnel(s) protecting this element. Mechanisms through which this location is retrieved are out of the scope of this document."

A specific method for distinguishing a link failure from a node failure is proposed by draft-vasseur-mpls-linknode-failure-00.txt (also formulated in US2003233595). It is based on exchanging so-called "Hello" messages over an alternative path between the PLR and NHOP, for detecting when NHOP is not reachable. The author of that specific method proposes two schemes of behavior for the PLR upon link failure detection. Scheme 1, Step 1: assume a link failure occurred and switch traffic to the link protecting backup LSP. Step 2: if later it becomes clear (via Hellos) that the NHOP is down, move traffic to the node protecting backup LSP. Scheme 2, Step 1: assume a node failure occurred and switch traffic to the node protecting backup LSP. Step 2: if later it becomes clear (via Hellos) that the NHOP is up, move traffic to the link protecting backup LSP.

The above method has the following disadvantages: (1) Performance: PLR and NHOP need to exchange Hello messages based on which a node failure is detected. These messages consume resources, and could create a performance burden on the PLR, especially if it has many protected links. (2) Detection Time: PLR should waist time for several Hello acknowledgements, plus a propagation delay from NHOP, before Step 2 can be executed. (3) Availability: A need for an alternate path to carry the Hellos between PLR and NHOP. Such a path is not always available. The backup LSP could carry the Hellos from PLR to NHOP but there is still a need for a path in the reverse direction. Such a complex backup path might also fail/not reliably deliver the Hellos, thereby causing false indications.

A totally different approach is called for, i.e. an approach that would practically address the FRR duplication problem, while avoiding the potentially intolerable drawbacks discussed above.

OBJECT AND SUMMARY OF THE INVENTION

The object of the present invention is to propose a fast reroute protection technique covering both link and node failures per hop along communication logical paths in general, and MPLS P2P and P2MP LSPs in particular. This method would address the FRR duplication problem while avoiding the disfavors of the prior art solutions.

The Inventor's idea is to use backup LSP(s) to provide both link and node protection concurrently (thus initiating so-called Dual or concurrent FRR), while configuring a suitable blocking rule at the link protection merge point (the NHOP), to avoid traffic duplication that would otherwise occur with standard FRR. The proposed blocking rule says: prevent the traffic that arrives on a backup LSP participating in a Dual FRR backup configuration (hereafter and actually, on a dual FRR backup LSP), from forwarding it toward NNHOPs which are already protected against NHOP's failure. In other words, NHOP should not forward traffic, arriving via a Dual FRR backup LSP, to working sub-LSPs or P2P LSPs that are protected against NHOP's failure.

The Dual FRR backup LSP(s) may comprise an ordinary backup LSP that provides at least link protection from PLR to NHOP. The ordinary backup LSP may either be P2P or P2MP backup LSP, where in the latter case it can also provide node protection. The concept of the invention has been described with reference to MPLS networks and using specific terms characteristic for indicating paths and nodes in such networks. However, the inventive method can be applied to other communication networks supporting fast reroute-like mechanisms, say to IP networks.

Therefore, the general concept of the invention can be briefly defined as follows:

A method for fast rerouting (FRR) of traffic in a communication network, from a working path comprising a link connecting a first node and a downstream second node, to one or more backup paths concurrently providing link protection and node protection to the link and the second node; the method comprises enabling the second node to block forwarding of traffic, if received at the second node along the backup path(s), towards a more-downstream third node in the working path in case the third node participates in providing node protection against a failure of the second node;

the method thereby prevents traffic duplication at the third node and does not require distinguishing a link failure from a node failure.

In MPLS networks, the working path is usually called a working LSP, the first node in the described concept can be called a point of local repair PLR, and the second downstream node can be called a next hop node NHOP. The farther downstream node(s) of the working path, including the third node, are usually called next-next hop nodes NNHOPs. Using these terms, the method can be then formulated more specifically.

A method for fast rerouting of traffic (for example, by performing a Fast Reroute FRR mechanism) in a communication network (for example, in an MPLS network), from a working communication path (for example, a working LSP) comprising a first node (called a point of local repair PLR), a link connecting the first node and a second downstream node (called a net hop node NHOP), and one or more third nodes (called next-next hop nodes NNHOPs) positioned downstream to said second node along the working path; the method comprises:

pre-provisioning of one or more point to point (P2P) or point to multipoint (P2MP) backup paths (such as backup LSPs) in the network, concurrently providing link protection against failure of said link and node protection against failure of said second node (NHOP), thereby ensuring so-called Dual (concurrent) FRR for said link and said second node;

providing said second node (NHOP) with a blocking rule enabling to block forwarding of traffic, if received at NHOP via said one or more pre-provisioned backup paths (backup LSPs), towards a specific third node out of said one or more third nodes (NNHOPs) in case when said specific third node (NNHOP) participates in providing node protection to said second node (NHOP); the method thereby prevents traffic duplication at said third node (NNHOP) in case the traffic is rerouted by the first node (PLR) to the backup path(s), and does not require distinguishing a link failure from a node failure at the PLR or any other node.

The blocking rule can be formulated in a different manner. Namely, the blocking rule
a) blocks forwarding the traffic received at NHOP via said one or more backup paths, towards those third nodes NNHOPs out of said one or more third nodes, which participate in node protection to the NHOP for the particular working LSP, while
b) allows forwarding said traffic towards remaining third nodes out of said one or more third nodes NNHOPs, wherein the remaining third nodes do not participate in node protection to the NHOP for the particular working LSP.

In view of the above method, one pre-provisioned backup path (LSP) may provide the link protection while another pre-provisioned one may provide the node protection to achieve the Dual FRR for the link between the PLR and the NHOP and for the NHOP itself. Alternatively, one backup path (P2MP LSP) could provide both link and node protection concurrently.

As has been mentioned above in the Summary, an ordinary backup LSP may either be P2P or P2MP backup LSP; in the latter case it can provide both the link and the node protection.

There is further provided a management entity in a communication network, adapted to pre-provision one or more backup paths for a working path to provide concurrent link and node fast reroute protection of said working path, the management entity being also adapted to produce instructions and blocking rules for nodes of the network for implementing the proposed method. The entity can be a management system such as an element (node) management system, a network management system or a combination of the both. Instructions and blocking rules can be transmitted via a signaling protocol.

According to a yet a further aspect of the invention, there is provided a network node comprising hardware and/or software means with modified functions which would enable operation of the network node as a modified PLR node or as a modified NHOP node of a working path, according to the new proposed technique and depending on a specific configuration of the working path.

For example, the hardware/software means of the network node can be designed for:

receiving management and/or signaling instructions, pre-provisioning concurrent FRR link and node protection backup paths, and setting flags to enable functioning of said network node as the PLR node;

communicating with the PLR using management and/or signaling instructions, analyzing the flags, storing and implementing the blocking rule, thereby enabling functioning of said network node as the NHOP node.

According to an additional aspect of the invention, there is also provided a software product comprising software implementable instructions and/or data for carrying out the above-described method.

BRIEF DESCRIPTION OF THE DRAWINGS

The principle of the invention is described and illustrated with reference to the following non-limiting examples of MPLS network fragments, in which:

FIG. 1 (prior art) schematically illustrates a point to point (P2P) working LSP.

FIG. 2 (prior art) schematically illustrates a point to multipoint (P2MP) working LSP.

FIG. 3 (prior art) schematically illustrates a PTP working LSP for which backup LSPs are pre-provisioned for possible Fast Reroute (FRR).

FIG. 4 (prior art) schematically illustrates a P2MP working LSP for which backup LSPs are pre-provisioned for performing Fast Reroute (FRR).

FIG. 5 (prior art) schematically illustrates a P2MP working LSP for which a P2MP Backup LSP is pre-provisioned for performing Fast Reroute (FRR).

FIG. 6 (prior art) is one example schematically illustrating how a traffic duplication problem occurs when performing FRR while not distinguishing a link from a node failure.

DETAILED DESCRIPTION OF THE PREFERRED EMBODIMENTS

Figure 7A:
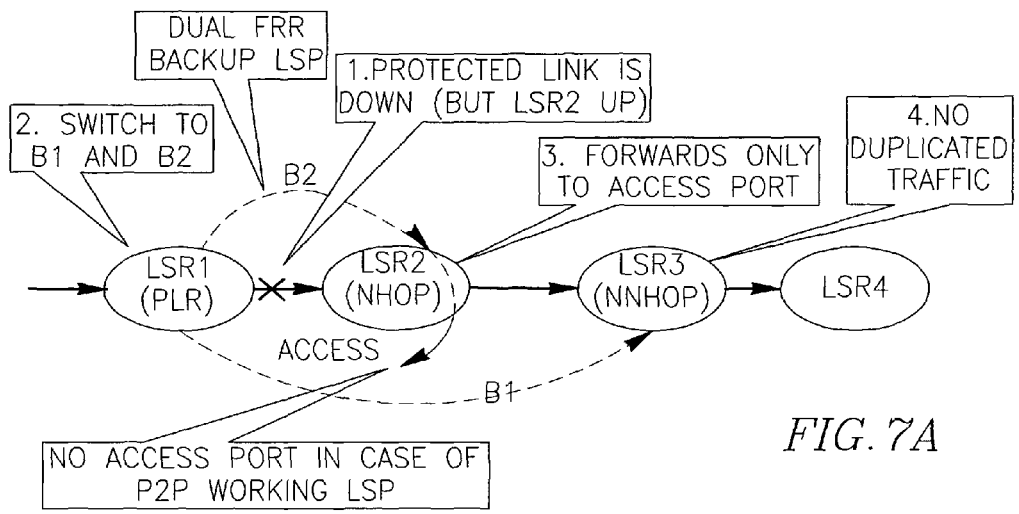
FIG. 7 a, b, c are examples illustrating how the traffic duplication problem can be resolved by applying the proposed inventive method of Dual FRR to various combinations of working LSP and backup LSPs (P2P and P2MP).

FIG. 7a illustrates a Dual FRR configuration for the basic case of FIG. 6, where B2 serves as a Dual FRR backup LSP whose egress LSR is NHOP.

Link failure FRR Scenario (covers Case A mentioned in the description to FIG. 6): If the protected link LSR1 to LSR2 goes down but LSR2 stays up, PLR LSR1 would switch traffic to both B1 and B2, not distinguishing a link from a node failure. Traffic arriving on B1 to NNHOP LSR3 returns to the working LSP towards LSR4.

When traffic arrives on B2 to NHOP LSR2 (B2's egress LSR), NHOP avoids forwarding traffic to NNHOP LSR3, as the latter is protected against the NHOP's failure, and sends it only to the access port of LSR2. In other words, NHOP avoids forwarding to sub-LSPs going in the direction of LSR3, as they have node protection at PLR LSR1. Thus, LSR3 receives traffic only from B1, and duplication is avoided.

Node failure FRR Scenario: If LSR2 goes down, description is the same as above, except that NHOP is anyway down and cannot cause traffic duplication.

Figure 7B:
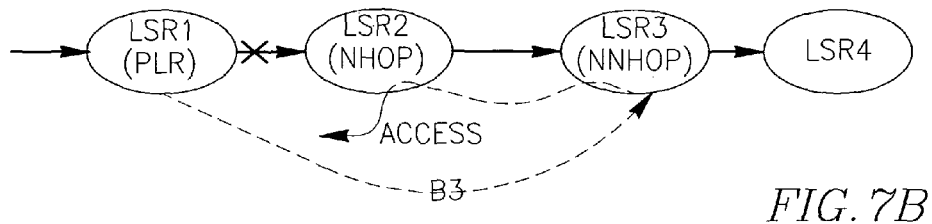

FIG. 7b illustrates a Dual FRR configuration using a P2MP Dual FRR backup LSP B3, where NHOP and NNHOP serve as its leaf and transit&leaf LSRs, respectively.

Link failure FRR Scenario (covers Case A): If the protected link LSR1 to LSR2 goes down but LSR2 stays up, PLR LSR1 would switch traffic to B3, not distinguishing a link from a node failure. Traffic arriving on B3 to NNHOP LSR3 returns to the working LSP towards LSR4. Since NNHOP LSR3 is a transit & leaf LSR for B3, traffic also continues on B3 towards LSR2.

NHOP LSR2 (B3's leaf) avoids forwarding traffic to NNHOP LSR3, as the latter is protected against the NHOP's failure, so NHOP sends the traffic only to the access port. In other words, NHOP avoids forwarding traffic to sub-LSPs going in the direction of LSR3 as they have node protection assigned at PLR LSR1 (say, PLR informs NHOP about that via signaling, or the blocking rule is manually configured on NHOP). Thus, LSR3 receives traffic only from B3, and duplication is avoided.

Node failure FRR Scenario: If LSR2 goes down, description is the same as above, except that NHOP is anyway down and cannot cause traffic duplication.

Figure 7C:
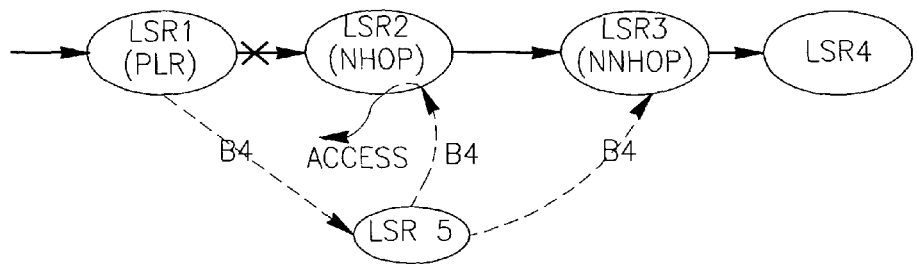

FIG. 7c illustrates an example of a Dual FRR configuration using a P2MP Dual FRR backup LSP B4, where both NHOP and NNHOP serve as its leaves.

Link failure FRR Scenario (covers Case A): If the protected link LSR1 to LSR2 goes down but LSR2 stays up, PLR LSR1 would switch traffic to B4, which would deliver the traffic to both NNHOP LSR3 and NHOP LSR2. Traffic arriving to NNHOP LSR3 returns to the working LSP towards LSR4.

NHOP LSR2 (B4's leaf) avoids forwarding traffic to NNHOP LSR3, as the latter is protected against failure of the former, and sends the traffic only to the access port of LSR2. Thus, LSR3 receives traffic only from B4, and duplication is avoided.

Node failure FRR Scenario: If LSR2 goes down, description is the same as above, except that NHOP is anyway down and cannot cause traffic duplication.

Case D. The working LSP can lie referred to as P2P LSP if the access port at LSR2 were removed (see a reservation in FIG. 8a). Thus, traffic arriving to NHOP LSR2 on B2, B3 or B4 (see 7a, 7b, 7c respectively) is just discarded, avoiding the traffic duplication at LSR3.

Figure 8:
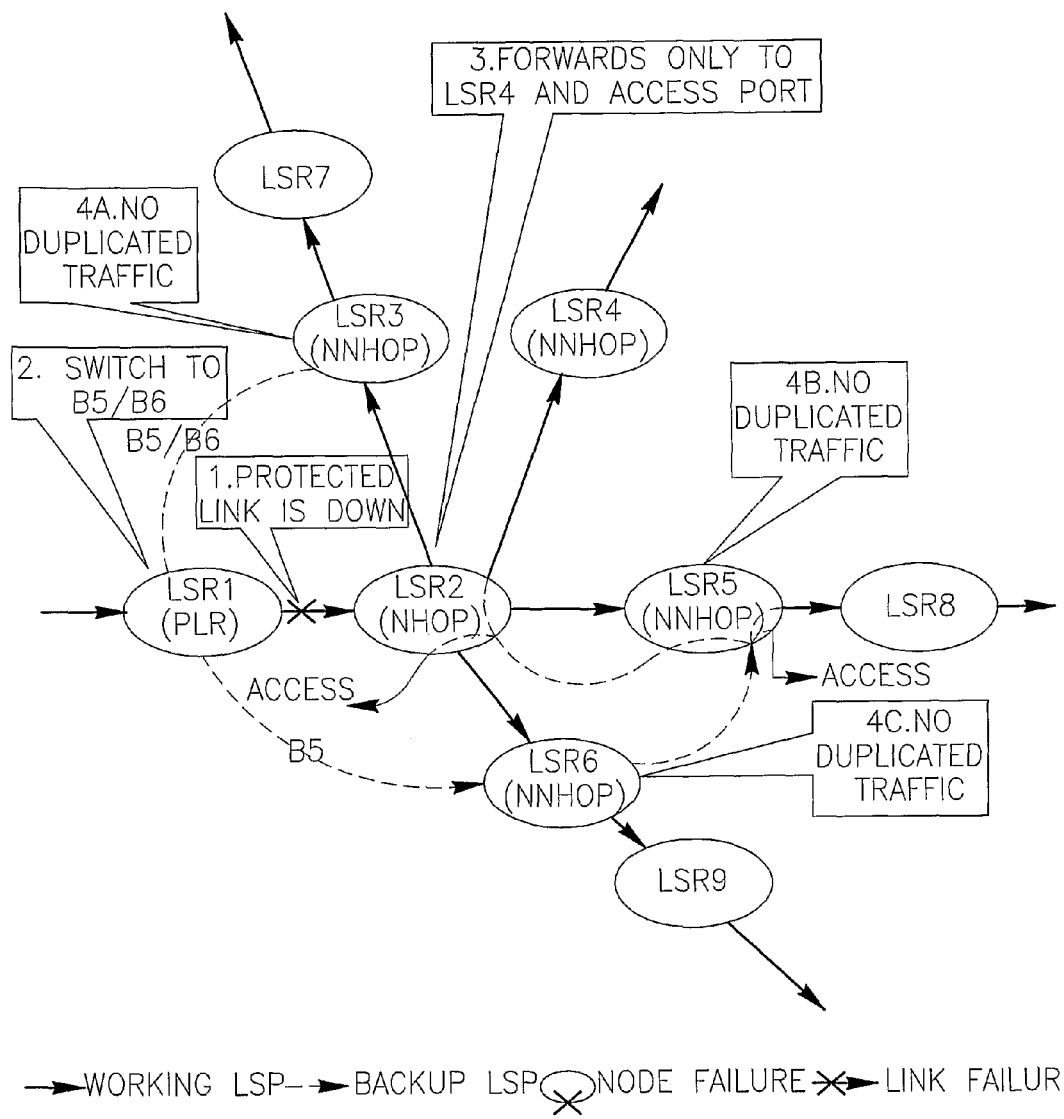
FIG. 8 is another example illustrating how the proposed Dual FRR principle can be applied to yet another combination of a working and backup LSPs.

FIG. 8 illustrates an advanced case of the Dual FRR. A portion of a P2MP LSP is flowing from LSR1 to transit&leaf LSR2, where traffic splits towards LSR3, LSR4, transit&leaf LSR5, and LSR6. Traffic also continues from LSR3/LSR5/LSR6 to LSR7/LSR8/LSR9, respectively. FRR protection is as follows: B5 provides link protection towards LSR2 and LSR4 (how link protection is provided towards LSR4 is described below) and node protection towards LSR3, LSR5, and LSR6.

Link failure FRR Scenario (covers cases A,B,C): If the protected link LSR1 to LSR2 goes down but LSR2 stays up, PLR LSR1 would switch traffic to B5, not distinguishing a link from a node failure. Traffic arriving on B5 to NNHOP LSR3 (LSR6) returns to the working LSP towards LSR7 (LSR9), respectively. Since LSR6 is a transit&leaf LSR for B5, traffic also continues on B5 towards LSR5.

Traffic arriving on B5 to NNHOP LSR5 is sent to the access port and also returns to the working LSP towards LSR8. Since NNHOP LSR5 is a transit&leaf LSR for B5, traffic also continues on B5 towards LSR2.

NHOP LSR2 (B5's leaf) avoids forwarding traffic to NNHOPs LSR3/LSR5/LSR6, as they are protected against its failure, and sends it only to the Access port and LSR4. In other words, NHOP avoids forwarding to sub-LSPs going in the direction of LSR3/LSR5/LSR6 as they have node protection (against failure of LSR2), assigned at PLR LSR1. Thus, NNHOPs LSR3/LSR5/LSR6 receive traffic only from B5, and the traffic duplication is avoided. Note that LSR4 gets a copy of the traffic from LSR2 (i.e., NHOP does not block forwarding to LSR4 of the traffic received along B5, since LSR4 is not protected against failure of LSR2) and benefits from link protection, which would be impossible without the Dual FRR mechanism.

Mixed P2P and P2MP Backup: P2P backup LSP B6 could replace B5 in providing FRR node protection towards NNHOP LSR3. Traffic arriving on B6 to NNHOP LSR3 returns to the working LSP towards LSR7, while NHOP LSR2 avoids forwarding traffic to NNHOP LSR3, as LSR3 is protected against LSR2's failure.

Node failure FRR Scenario: If LSR2 (NHOP) goes down, description is the same as above, except that NHOP is anyway down and cannot cause traffic duplication. NNHOP LSR4 will not get a copy of the traffic, and this is normal because LSR4 is originally not protected against the failure of LSR2.

In the general case, the proposed method allows configuring a blocking rule for sub-LSPs of the working LSP (i.e., for branches of the main working LSP, see FIG. 8 where traffic splits towards LSR3, LSR4, transit&leaf LSR5, and LSR6 being all NNHOP nodes). For the working sub-LSPs, having the assigned node protection by ordinary or dual FRR backup LSPs, this blocking rule will prevent duplication of the traffic, when PLR applies the concurrent link and node FRR.

In particular, the blocking rule at NHOP can be applied only to sub-LSPs which have the assigned node protection at PLR, while not applying the blocking rule to other sub-LSPs which thus can benefit from link protection when the link from PLR to NHOP fails. The method thereby allows supporting concurrent link and node protection on per LSP basis.

As can be seen from the above two exemplary embodiments, the proposed invention meets its objectives. It resolves the FRR duplication problem while eliminating the prior art disadvantages: (1) Performance: No need for Hello exchange to detect a node failure; as the PLR does not distinguish between link and node failures (2) Detection Time: PLR triggers link and node FRR upon link failure, this can be done very fast based on physical layer indications (3) Availability: no need for an alternate path, as there, are no Hellos to exchange.

Realization. The Dual FRR method can be implemented by either static or dynamic provisioning. The static provisioning could be achieved using either central and/or local management entity. The Dual FRR configuration implementation could include:

(a) Dual FRR flag per backup LSP hop: enabled at NHOP for any Dual FRR backup LSP protecting the link from PLR to NHOP.

(b) Dual FRR flag per working sub-LSP (or P2P LSP) hop: enabled at NHOP for any working sub-LSP (or P2P LSP) which is protected at PLR against NHOP's failure.

NHOP then applies the blocking rule when both (a) and (b) are enabled, i.e., when traffic whose Dual FRR flag is enabled according to rule (b) is received on backup LSP whose Dual FRR flag is enabled according to rule (a).

The dynamic provisioning can be achieved via MPLS signaling protocol such as RSVP (French title of the protocol, that translates "Please Respond"). For instance:

(1) Dual FRR flag per backup LSP: may be indicated by PLR via a dedicated RSVP object or flag. The flag will be read (recognized) by the NHOP and used accordingly.

(2) Dual FRR flag per working sub-LSP: may be based on the so-called Record Route object, with which PLRS indicate that a sub-LSP has assignment for node protection. Thus, if a sub-LSP has node protection at PLR, NHOP would enable the Dual FRR flag.

The blocking rule would then be applied similarly to the static provisioning.

The mentioned flags are "put on" or "enabled" at the NHOP owing to information obtained from the PLR, thus allowing the NHOP to analyze the flags and make the blocking decision.

Each node should be provided with local software and/or hardware means for executing instructions including the blocking rule and the abovementioned flags, which are set on or off based on a configuration received via static and/or signaling-based mechanisms.

It should be appreciated that other combinations of working and backup paths can be created in a practical network being an MPLS or a non-MPLS one, and that other practical implementations can be proposed for realizing the proposed concept of avoiding traffic duplication when utilizing the FRR mechanism.

The invention claimed is:

1. A method for fast rerouting (FRR) of traffic in a communication network, from a working path comprising a link connecting a first node and a second, downstream node, to one or more backup paths concurrently providing link protection and node protection to the link and the second node; wherein the first node is called a point of local repair PLR, said second node is called a next hop node NHOP, and wherein the working path comprises one or more third nodes positioned downstream to said second node along said working path and called next-next hop nodes NNHOPs; the method comprises:

pre-provisioning one or more backup paths in the network for concurrently providing link protection against failure of said link connecting said first node (PLR) and said second node (NHOP), and node protection against failure of said second node;

preventing the second node from forwarding of traffic, if received at the second node along said one or more backup paths, towards a more-downstream third node in the working path in case the third node participates in providing node protection against node failure of the second node;

providing said second node (NHOP) with a blocking rule enabling to block forwarding of traffic, if received at said second node along said one or more backup paths, towards a third node out of said one or more third nodes (NNHOPs) in case said third node participates in providing node protection against the failure of said second node, wherein the blocking rule:

a) blocks forwarding the traffic received at said second node via said one or more backup paths, towards those third nodes out of said one or more third nodes, which participate in node protection against failure of said second node, while b) allows forwarding said traffic towards remaining third nodes out of said one or more third nodes, wherein the remaining third nodes do not participate in node protection against failure of said second node;

carrying out fast rerouting (FRR) of traffic in said communication network, from a working path to the one or more backup paths, thereby enabling conveyance of traffic from said first node of the communication network to said third node of the communication network while preventing traffic duplication at the third node and without distinguishing a link failure from a node failure.

2. The method according to claim 1, specifically designed for MPLS networks and comprising performing the FRR to reroute traffic from the working path being an LSP; said one or more backup paths being backup LSPs.

3. The method according to claim 1, wherein any path out said working path and said one or more backup paths is either point-to-point (P2P) or point-to-multipoint (P2MP).

4. The method according to claim 1, further comprising informing the second node about: said one or more backup paths providing concurrent link and node protection; a working sub-path extending through said second node to said specific third node participating in providing node protection to said second node; and wherein the second node is adapted to avoid forwarding of traffic, arrived to the second node along said one or more backup paths.

5. The method according to claim 4, wherein the step of informing the second node is performed by using management and/or signaling mechanisms.

6. A management system in a communication network, adapted to pre-provision one or more backup paths for a working path to provide concurrent link and node fast reroute protection for the working path, and being also adapted to produce instructions and blocking rules to nodes of the network for implementing the method according to claim 1.

7. A network node in a communication network, provided with hardware and/or software means enabling operation of said network node as the PLR node or as the NHOP node depending on a specific configuration of the working path and according to the method of claim 1.

8. A software product comprising software implementable instructions and/or data stored on a non-transitory computer readable medium for carrying out the method according to claim 1.

* * * * *